F. W. BRADLEY.
PIPE COUPLING.
APPLICATION FILED APR. 14, 1910.

1,034,965.

Patented Aug. 6, 1912.
2 SHEETS—SHEET 1.

Witnesses:
Richard Sommer
Alfred Bokenhagen

Inventor
Francis W. Bradley
by Geyer & Popp
Attorneys.

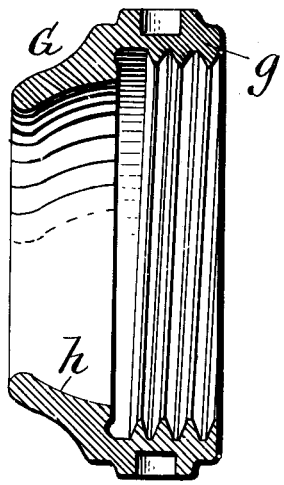
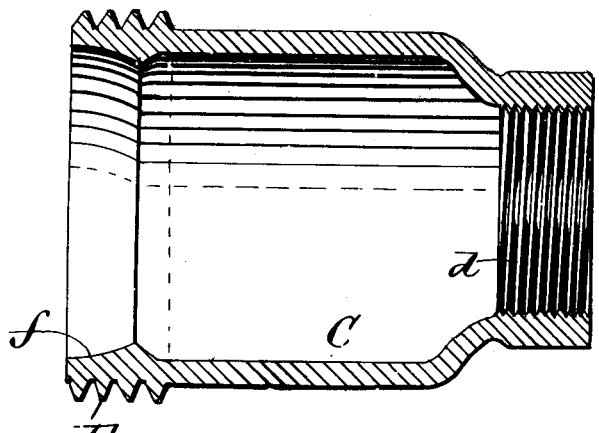
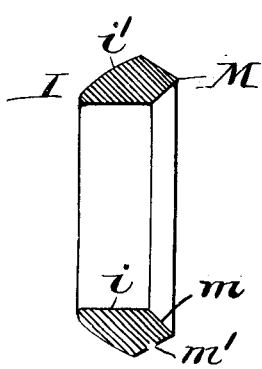
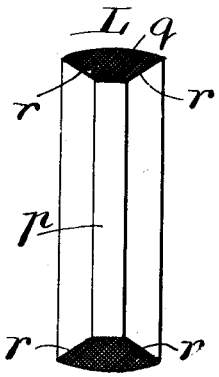
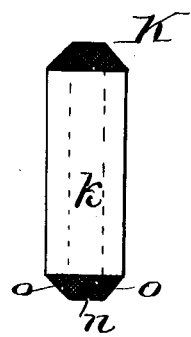

UNITED STATES PATENT OFFICE.

FRANCIS W. BRADLEY, OF BUFFALO, NEW YORK.

PIPE-COUPLING.

1,034,965.

Specification of Letters Patent.

Patented Aug. 6, 1912.

Application filed April 14, 1910. Serial No. 555,338.

*To all whom it may concern:*

Be it known that I, FRANCIS W. BRADLEY, a citizen of the United States, residing at Buffalo, in the county of Erie and State of New York, have invented new and useful Improvements in Pipe-Couplings, of which the following is a specification.

This invention relates to a coupling for pipes which permits two pipes to move lengthwise and also turn laterally relatively to one another for effecting a connection between the same.

Figure 1:
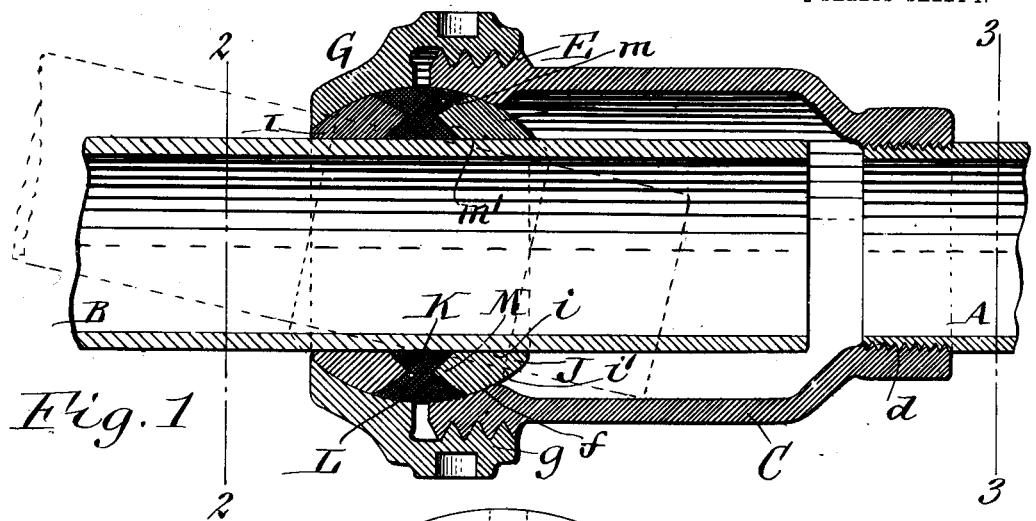
Figure 2:
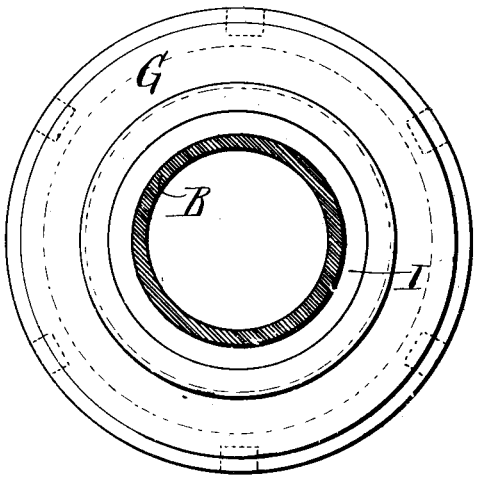
Figure 3:
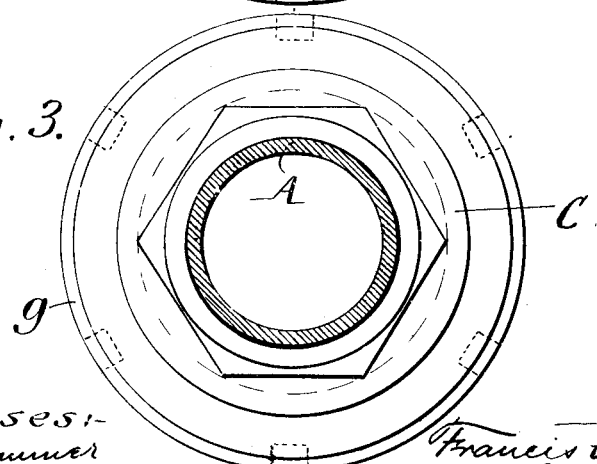

In the accompanying drawings consisting of 2 sheets: Figure 1 is a longitudinal section of my improved pipe coupling. Figs. 2 and 3 are cross sections of the same in the correspondingly numbered lines in Fig. 1. Fig. 4 is a detached longitudinal section of the body of the coupling. Fig. 5 is a similar view of the gland of the coupling. Figs. 6, 7 and 8 are similar views of different sections of the ball-shaped packing which is interposed between the gland, body and one of the pipes.

Similar letters of reference indicate corresponding parts throughout the several views.

A, B represent the pipes which are adapted to be connected by my improved coupling.

C represents the body of the coupling which is of tubular form and of larger diameter than said pipes and which is provided at one end with an internal screw thread $d$ whereby the same may be connected with the pipe A. The opposite end of the coupling body is provided with an external screw thread E and with an internal spherical socket or seat $f$.

G represents a gland which is provided at its inner edge with an internally screw threaded annular flange $g$ which is adapted to engage with the external thread E of the body and at its outer edge with an internal spherical seat or socket $h$.

The seats $h$ and $f$ together form a spherical seat or ball socket for a ball which is capable of turning therein and which is provided with a cylindrical diametrical opening through which the pipe B is capable of sliding lengthwise. This ball is preferably so constructed that it also operates as a packing for producing a tight joint between the two pipes upon applying endwise pressure on the ball. For this purpose the ball is preferably constructed in four annular rings or sections, an outer end ring I, an inner end ring J, an inner intermediate ring K and an outer intermediate ring L. The outer end ring has a cylindrical bore $i$ which engages the periphery of the pipe B, an outer spherical surface $i^1$ which engages the spherical surface of the gland and an annular tapering tongue M at its inner edge which is V-shaped in cross section so as to form inner and outer inclined faces $m$, $m^1$ which incline from the crown of the tongue inwardly and outwardly.

The inner end ring J is of the same form as the outer end ring but is reversed, so that the inner and outer inclined faces $m$, $m^1$ of its tapering tongue M face those of the outer ring while its bore $i$ engages with the pipe B and its spherical periphery $i^1$ engages with the spherical seat $f$ of the coupling body, as shown in Fig. 1. The inner intermediate ring K has a cylindrical bore $k$ which engages the periphery of the pipe B, a cylindrical periphery $n$ and inwardly inclined annular faces $o$, $o$ at its opposite ends which engage with the inner inclined faces $m$ of the end rings. The outer intermediate ring L is provided with a cylindrical bore $p$ which is arranged opposite the cylindrical periphery of the inner intermediate ring, a spherical periphery $q$ which engages partly with the spherical seat of the gland and partly with the spherical seat of the coupling body and outwardly inclined annular faces $r$, $r$ at its opposite ends which engage with the correspondingly inclined outer faces $m^1$ of the end rings.

The end rings are preferably constructed of hard metal, such as brass, but the intermediate rings are preferably constructed of fiber or other soft material which serves as a packing. Upon tightening the gland the end rings are moved lengthwise toward each other while the inner intermediate ring is pressed inwardly against the periphery of the pipe B by the action of the coöperating inclines $m$, $o$ and the outer intermediate ring is pressed outwardly against the spherical faces of the body and gland by the action of the inclines $m^1$, $r$, thereby producing a tight joint between the pipes.

In the use of this coupling it is possible for the two pipes A, B to move lengthwise relatively to each other inasmuch as the pipe B can slide freely through the ball and it is also possible for these pipes to stand at an angle relatively to each other inasmuch as the ball is free to turn in the socket the requisite extent for this purpose. This coupling is therefore useful in all cases where these conditions exist or are likely to arise. The longitudinal adjustment would be desirable in cases of pipes which are liable to expand and contract, it also permits of making a connection between pipes without necessitating exact cutting of the pipes as to length, inasmuch as the coupling can telescope more or less without affecting its operation. Furthermore, the ball joint permits of reliably connecting pipes which are out of line or at an angle relatively to each other. This coupling also serves as a union between pipes and permits of connecting pipes without requiring special shapes of fittings, for instance, when fitting pipes around a circular furnace.

When used for connecting the pipes in a building or in a railway train the wind strains on the building or movement of train will not affect the pipes, inasmuch as this coupling permits the pipes to adapt themselves to such strain without producing leakage or breakage. If undue strain should cause a leak in the coupling this can be quickly remedied by tightening the gland.

I claim as my invention:

A pipe coupling comprising a tubular body adapted to be connected at one end with one pipe and provided at its opposite end with an external screw thread and an internal semi-spherical seat, a gland provided with an internal semi-spherical seat and an internally threaded flange engaging with the thread of said body, and a ball turning in the ball socket formed by said semi-spherical seats and provided with a diametrical opening in which the other pipe is adapted to slide lengthwise, said ball comprising two end rings, an inner intermediate ring and an outer intermediate ring, said end rings being provided on their opposing sides each with a tapering annular tongue, said inner intermediate ring having outer annular inclined faces at its opposite edges which engage with the inner inclined faces of the tapering tongues, and said outer intermediate ring having inner inclined faces at its opposite edges which engage with the outer inclined faces of the tapering tongues.

Witness my hand this 4th day of April, 1910.

FRANCIS W. BRADLEY.

Witnesses:
JAMES F. WARD,
D. E. DONOVAN.